United States Patent
Wang et al.

(10) Patent No.: US 12,039,657 B2
(45) Date of Patent: Jul. 16, 2024

(54) VIEW SYNTHESIS OF A DYNAMIC SCENE

(71) Applicant: ADOBE INC., San Jose, CA (US)

(72) Inventors: Oliver Wang, Seattle, WA (US); Simon Niklaus, San Jose, CA (US); Zhengqi Li, New York, NY (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/204,571

(22) Filed: Mar. 17, 2021

(65) Prior Publication Data

US 2022/0301252 A1    Sep. 22, 2022

(51) Int. Cl.
| | | |
|---|---|---|
| G06T 15/04 | (2011.01) | |
| G06T 7/557 | (2017.01) | |
| G06T 7/90 | (2017.01) | |
| G06T 15/50 | (2011.01) | |

(52) U.S. Cl.
CPC .............. *G06T 15/04* (2013.01); *G06T 7/557* (2017.01); *G06T 7/90* (2017.01); *G06T 15/506* (2013.01); *G06T 2207/10016* (2013.01); *G06T 2207/20084* (2013.01); *G06T 2207/30244* (2013.01)

(58) Field of Classification Search
CPC .......... G06T 15/04; G06T 7/90; G06T 7/557; G06T 15/506; G06T 2207/10016; G06T 2207/20084; G06T 2207/30244
See application file for complete search history.

(56) References Cited

U.S. PATENT DOCUMENTS

| | | | |
|---|---|---|---|
| 10,679,046 B1 * | 6/2020 | Black ..................... | G06V 40/23 |
| 2019/0088004 A1 * | 3/2019 | Lucas ..................... | G06T 19/20 |
| 2019/0096046 A1 * | 3/2019 | Kalantari ................ | G06T 7/337 |
| 2019/0340810 A1 * | 11/2019 | Sunkavalli ............ | G06T 15/506 |
| 2020/0320795 A1 * | 10/2020 | Dubnov ................ | G06T 19/006 |
| 2021/0065440 A1 * | 3/2021 | Sunkavalli ............... | G06N 3/08 |
| 2021/0390677 A1 * | 12/2021 | Do .......................... | G06T 11/60 |
| 2021/0390761 A1 * | 12/2021 | Kowalski ................ | G06T 17/10 |
| 2022/0036602 A1 * | 2/2022 | Duckworth ............. | G06T 19/20 |
| 2022/0065620 A1 * | 3/2022 | Fanello ................ | G01B 11/245 |
| 2022/0084231 A1 * | 3/2022 | Guizilini ................... | G06T 7/33 |

OTHER PUBLICATIONS

Mildenhall et al; "NeRF: Representing Scenes as Neural Radiance Fields for View Synthesis"; Aug. 2020; Springer; Computer Vision—ECCV 2020, 16th European Conference Proceedings; pp. 405-421 (Year: 2020).*

* cited by examiner

*Primary Examiner* — Matthew Salvucci

(74) *Attorney, Agent, or Firm* — Shook, Hardy & Bacon L.L.P.

(57) ABSTRACT

Embodiments of the technology described herein, provide a view and time synthesis of dynamic scenes captured by a camera. The technology described herein represents a dynamic scene as a continuous function of both space and time. The technology may parameterize this function with a deep neural network (a multi-layer perceptron (MLP)), and perform rendering using volume tracing. At a very high level, a dynamic scene depicted in the video may be used to train the MLP. Once trained, the MLP is able to synthesize a view of the scene at a time and/or camera pose not found in the video through prediction. As used herein, a dynamic scene comprises one or more moving objects.

15 Claims, 8 Drawing Sheets

VIEW SYNTHESIS OF A DYNAMIC SCENE

BACKGROUND

Novel view synthesis is an important problem in computer vision and graphics, with numerous applications in video editing such as "bullet-time" effects, stabilization, and virtual object insertion. Most prior approaches in this domain make the assumption that the scene is static, or that it is observed from multiple synchronized input views. However, these restrictions are violated by most videos, such as those shared on the Internet today, which frequently feature dynamic scenes with diverse dynamic content (e.g., moving humans, moving animals, moving vehicles), recorded by a single camera.

Using multi-view constraints for moving objects is challenging, as doing so requires knowing the 3D motion of all scene points (i.e., the "scene flow"). Existing technologies covering novel view synthesis, dynamic scene reconstruction, and video understanding are unable to represent the scene flow.

Many methods using novel view synthesis propose first building explicit 3D scene geometry, such as point clouds or meshes, and the rendering this geometry from novel views. Light field rendering methods on the other hand, synthesize novel views by using implicit soft geometry estimates derived from densely sampled images. Numerous other works improve the rendering quality of light fields by exploiting their special structure. Yet another promising 3D representation is multiplane images (MPIs), which model a complex scene appearance.

Recently, deep learning methods have shown promising results by learning a representation that is suited for novel view synthesis. Such methods have learned additional deep features that exist on top of reconstructed meshes or dense depth maps. Alternately, pure voxel-based implicit scene representations have become popular due to their simplicity and convolutional neural network (CNN)-friendly structure. A recent variation of these approaches to represents a static scene as a neural radiance fields (NeRFs), which model the appearance and geometry of a scene implicitly by a continuous function, represented with an (multi-layer perceptron) MLP model. While the above methods have shown impressive view synthesis results, they all assume a static scene with fixed appearance over time, and hence cannot model temporal changes or dynamic scenes.

Another class of methods synthesizes novel views from a single RGB image. These methods typically work by predicting depth maps, sometimes with additional learned features, or a layered scene representation to fill in the content in disocculusion regions. While such methods, if trained on appropriate data, can be used on dynamic scenes, this is only possible on a per-frame (instantaneous) basis. These methods cannot leverage repeated observations across multiple views, or be used to synthesize novel times.

SUMMARY

Embodiments of the technology described herein, provide a novel view and time synthesis of dynamic scenes captured by a camera. Novel view synthesis artificially renders a scene from a camera view different from those in one or more input images or video frames. Novel time synthesis artificially renders a scene at a time different from those associated with an input video. For example, a video frame may be rendered at a time between input frames. The technology described herein represents a dynamic scene as a continuous function of both space and time. The technology may parameterize this function with a deep neural network (i.e., a multi-layer perceptron (MLP)), and perform rendering using volume tracing. At a very high level, a dynamic scene depicted in a video may be used to train the MLP to store a representation of the scene. Once trained, the MLP is able to synthesize a view of the scene at a time and/or camera pose not found in the video. Thus, the output of the technology may be an image of the synthesized view. Multiple images containing different synthesized views may be combined to form a synthesized video of the scene.

As used herein, a dynamic scene comprises one or more moving objects. A dynamic scene may also include static content. For example, a scene can include a girl dribbling a basketball on a basketball court. The girl and the basketball are dynamic components of the scene, while the court, backboard, net, bleachers, and other components may be static. Of course, some components that start out static in a video could become dynamic, such as when the net moves in response to the basketball going through it.

The trained the MLP may be described as a representation of the dynamic scene. In one aspect, the MLP used by the technology described herein comprises two separate MLPs. One of MLPs is optimized to represent static elements in a scene while the other MPL is optimized to represent dynamic elements in the scene. Outputs from the two MLPs may be combined to render a synthesized view. The outputs may be combined using a blending weight. The blending weight gives output from a static representation more weight when the output describes a static portion of the scene. Conceptually, this allows the output of the static optimized MLP to be used when rendering static objects and the dynamic optimized MLP to render dynamic objects. The weight can be derived during training as a function of training convergence. The portions of the scene with dynamic objects may not converge at the same rate as static portions during training because the input images for the dynamic portion of the scene will change from frame to frame.

Once trained, a desired point of view (e.g., camera pose) and time may be specified. For example, the user may manipulate a user interface to specify a point of view by moving a cursor, touching a touchscreen, making a gesture, or performing some other action that indicates a camera view. The user may similarly specify a time, such as by dragging a scrollbar back and forth. With these two inputs, the MLP representation may generate an output that can be rendered as an image of the scene. In another application, the view position and time is specified by a stabilization program that wants to synthesize a view from a consistent camera position across multiple frames. The technology described herein is not limited to these uses.

DETAILED DESCRIPTION

Overview

Figure 1:
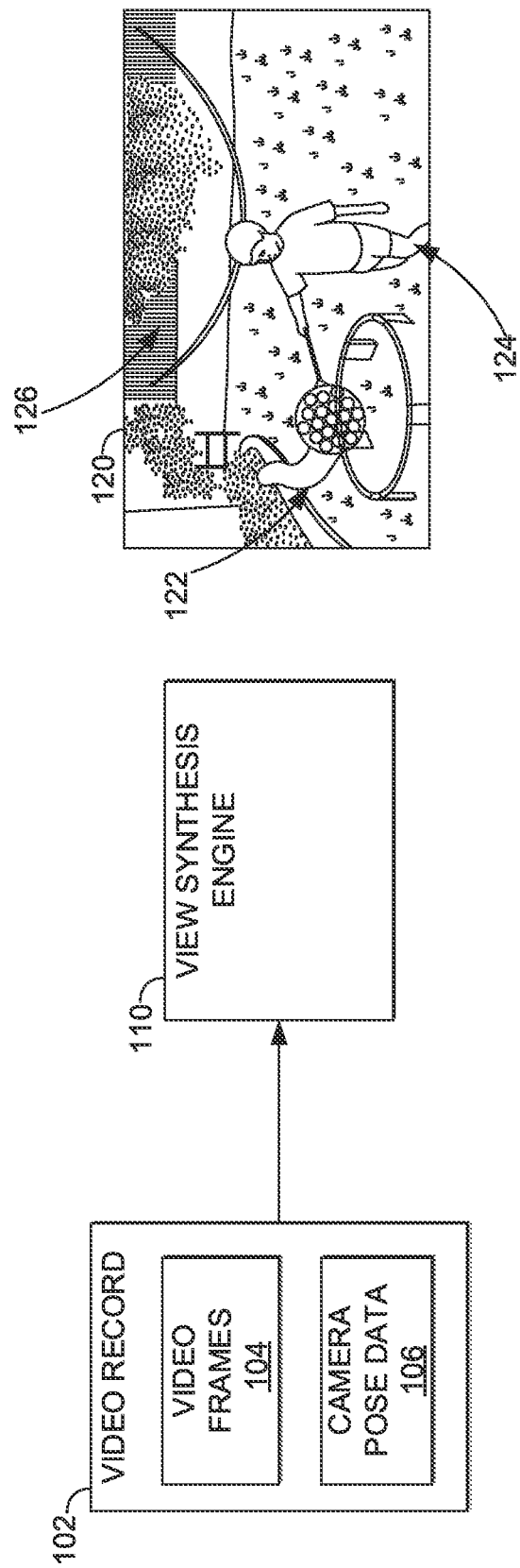
FIG. 1 provides a block diagram of providing an overview of a system for view synthesis a dynamic scene, in which embodiments described herein may be employed.

Embodiments of the technology described herein, provide a view and time synthesis of dynamic scenes captured by a camera. In one aspect, the camera may be a monocular camera, though aspects may be used with other types of cameras (e.g., a stereo camera) as well. The technology described herein represents a dynamic scene as a continuous function of both space and time. The technology may parameterize this function with a deep neural network (a multi-layer perceptron (MLP)), and perform rendering using volume tracing. At a very high level, a dynamic scene depicted in the video may be used to train the MLP. Once trained, the MLP is able to synthesize a view of the scene at a time and or camera pose not found in the video through prediction. Thus, the output of the technology may be an image of the synthesized view. Multiple images containing different synthesized views can be combined to form a synthesized video of the scene.

As used herein, a dynamic scene comprises one or more moving objects. A dynamic scene may also include static content. For example, a scene can include a girl dribbling a basketball on the basketball court. The girl and the basketball are dynamic components of the scene, while the court, backboard, net, bleachers, and other components may be static. Of course, some components that start out static in a video could become dynamic, such as when the net moves in response to the basketball going through it.

The trained the MLP may be described as a representation of the dynamic scene. In one aspect, the MLP used by the technology described herein comprises two separate MLPs. One of MLPs is optimized to represent static elements in a scene while the other MPL is optimized to represent dynamic elements in the scene. Outputs from the two MLPs may be combined to render a synthesized view. The outputs may be combined using a blending weight. The blending weight gives output from a static representation more weight when the output describes a static portion of the scene. Conceptually, this allows the output of the static optimized MLP to be used when rendering static objects and the output from the dynamic optimized MLP to render dynamic objects. The weight can be derived during training as a function of training convergence. The portions of the scene with dynamic objects may not converge at the same rate as static portions during training because the input images for the dynamic portion of the scene will change from frame to frame.

Both MLPs may attempt to build a representation of the entire scene, however, the static optimized MLP should do a better job of modeling or representing the static aspects of the scene because it is built without considering time as a limitation. This allows all frames in video depicting static aspects of the scene to be used in training the representation. On the other hand, the dynamic optimized MLP considers the time of the frames, which effectively results in less training data since it is trying to predict the appearance of an object at a point in time and the object may only be at that point in the scene for a few frames.

Outputs from the two MLPs may be combined to render a synthesized view. The outputs may be combined using a weight. The weight gives output from a static representation more weight when the output describes a static portion of the scene. Conceptually, this allows the output of the static optimized MLP to be used when rendering static objects. The weight can be derived during training because the portions of the scene with dynamic objects may not converge effectively during training.

The technology may optimize the weights of the dynamically optimized MLP during training using a scene flow warping loss that enforces that the scene representation is temporally consistent with the input images. As the technology models dense scene flow fields in 3D, the MLP can represent the sharp motion discontinuities that arise when projecting the scene into image space, even with simple low-level 3D smoothness priors.

The technology may use a disocclusion confidence measure to handle the inherent ambiguities of scene flow near 3D disocclusions. Disocclusion is the situation where a previously occluded object becomes visible, such as when a tree is visible after a car moves from in front of the tree or the scene is viewed from a different camera position where the car does not occlude the tree. The technology may also use data-driven priors to avoid local minima during optimization. The data driven priors use motion estimation and depth estimation, among other possible factors, to inform the training.

Once trained, a desired point of view (e.g., camera pose) and time may be specified. For example, the user may manipulate a user interface to specify a point of view by moving a cursor, touching a touchscreen, making a gesture, or performing some other action that indicates a camera view. The user may similarly specify a time, such as by dragging a scrollbar back and forth. With these two inputs, the MLP representation may generate an output that can be rendered as an image of the scene. In another application, the view position and time is specified by a stabilization program that wants to synthesize a view from a consistent camera position across multiple frames. The technology described herein is not limited to these uses.

Dynamic View Synthesis System

FIG. 1 illustrates an example dynamic view synthesis environment 100 in which methods of the present disclosure may be employed. A video record 102 may be the input the view synthesis engine 110 uses to build a dynamic scene representation. The video record may comprise a plurality of video frames 104 from a video and corresponding camera pose data 106 for each frame. The video frames 104 may depict only a single scene. The technology described herein builds a representation of a scene in order to synthesize views from the representation. Accordingly, the video may be limited to images of the scene that is to be synthesized.

The camera pose data may be generated by analyzing the video frames 104. The camera pose data may estimate the camera pose through analysis of an image or series of images in a video. If available, the camera pose data may be derived from camera sensor data (e.g., accelerometer data, gyroscope data). Once the camera pose data is generated, each frame may be associated with a camera pose through an index or some other method of correlating the pose data and frame.

The video record may be input to the view synthesis engine 110 to build a scene representation. The view synthesis engine 110 can comprise software operating on computer hardware having the capability to process and train an MLP. In a preferred aspect, the synthesis engine 110 hardware may include one or more graphics processing units (GPU). At a high level, generating the representation may comprise training a MLP to correctly predict an output that is consistent with the input frames and camera poses used in training. Once trained, the MLP may be said to hold a representation of the dynamic scene. In an aspect, the MLP can only hold the representation of one scene. In this aspect, the MLP may be trained for each new scene and operate on only one scene at a time. A camera pose and/or time can be submitted to the view synthesis engine 110 and an image 120 of the scene rendered from the representation. The rendering may use ray tracing where the rays are derived from the MLP output. Conceptually, the MLP predicts the correct appearance of the image from the requested pose and/or time. The requested camera pose and/or time may be novel, meaning the pose, time, and/or time/pose combination is not found associated with a frame in the video record 102.

The image 120 comprises dynamic and static components. The dynamic or static nature of an object may be apparent from viewing the input video 104. The dynamic components are the objects moving in the video and include the boy 124 swinging a bubble wand to make a bubble trail 122. The boy 124, wand, and bubbles 122 are all dynamic because they are moving within the scene. The fence 126 is static. Note that the camera may also be moving, which can give the appearance that the fence 126 is moving. However, the camera pose data 106 helps the view synthesis engine 110 differentiate between static objects and dynamic objects. The rendered image 120 may be output to a display device, such as a smart phone screen, or computer monitor.

Figure 2:
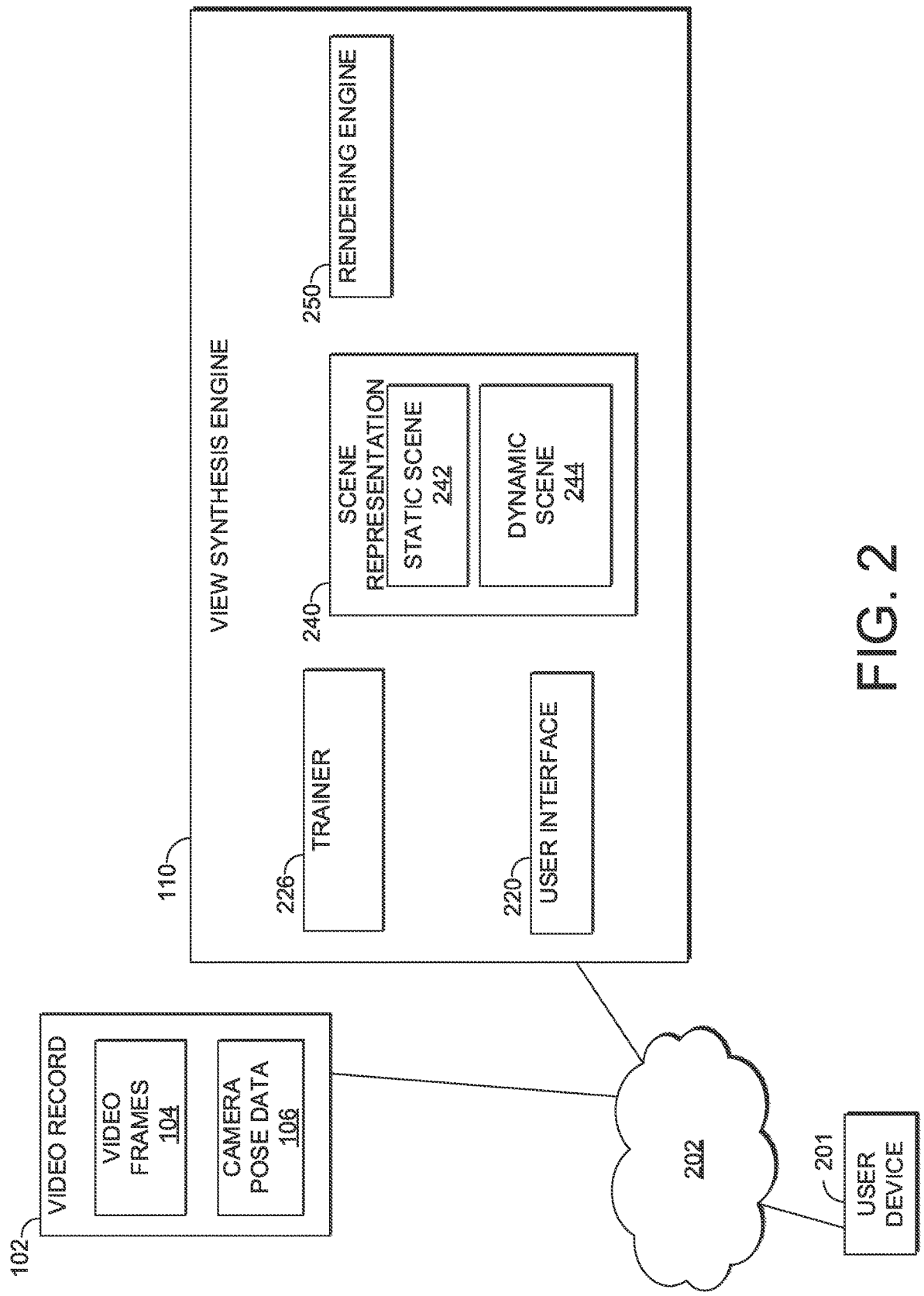
FIG. 2 is an illustration of a view synthesis system, in accordance with embodiments of the technology described herein.

Turning now to FIG. 2, a high-level architecture and operations of the view synthesis engine 110 in accordance with implementations of the present disclosure is shown. In one embodiment, the view synthesis engine 110 runs in one or more data centers. It should be understood that this and other arrangements described herein are set forth only as examples. Other arrangements and elements (e.g., machines, interfaces, functions, orders, and groupings of functions, etc.) may be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions are carried out by a processor executing instructions stored in memory.

Moreover, these components, functions performed by these components, or services carried out by these components are implemented at appropriate abstraction layer(s), such as the operating system layer, application layer, hardware layer, etc., of the computing system(s). Alternatively, or in addition, the functionality of these components and/or the embodiments of the technology described herein are performed, at least in part, by one or more hardware logic components. For example, and without limitation, illustrative types of hardware logic components include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein regarding specific components shown in example system 100, it is contemplated that in some embodiments functionality of these components are shared or distributed across other components.

Among other components not shown, the view synthesis environment 200 includes network 201, user device 202, a video record 102, and a view synthesis engine 110. The network 101 can take different forms including, without limitation, one or more local area networks (LANs) and/or wide area networks (WANs). In exemplary implementations, network 201 comprises the Internet and/or a cellular network, amongst any of a variety of possible public and/or private networks.

The user device 202 is alternatively described herein as a client device on the client-side of environment 200, while the view synthesis engine 110 may be described as the server-side of environment 200. The user device 202 is any type of computing device capable of use by a user. For example, in one embodiment, user device 202 is of the type of computing device described in relation to FIG. 8 herein. In various embodiments, the user device 202 is a personal computer (PC), a laptop computer, a mobile or mobile device, a smartphone, a tablet computer, a smart watch, a wearable computer, a virtual reality headset, augmented reality glasses, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, or any combination of these delineated devices, or any other suitable device.

The video record 102 comprise video frames 104 and camera pose data 106. The video may be formatted according to any of a number of available digital video formats, such as MPEG-4 (Moving Picture Experts Group), Quick-Time File Format (QTFF) (.MOV), WMV (Windows Media Video), FLV (Flash Video), AVI (Audio Video Interleave), AVCHD (Advanced Video Coding High Definition), WebM, or MKV (Matroska Multimedia Container). The camera pose data 106 may be generated by the camera pose estimator 228 and may specify the location from which an image was captured using a suitable coordinate system or other methodology for locating a camera in relation to a depicted scene.

The view synthesis engine 110 includes a user interface 220, a trainer 222, a motion estimator 224, a depth estimator 226, a camera pose estimator 228, a scene representation, a static scene representation 242, a dynamic scene representation 244, and a rendering engine 250. The view synthesis engine estimate 3D motion in a dynamic scene by explicitly modeling forwards and backwards scene flow as dense 3D vector fields. The estimate relied on a timevariant (dynamic) scene reconstruction described as a scene representation 240 herein. In one aspect, the scene representation models static components in a static scene representation 242 and dynamic components in the dynamic scene representation 244. An example architecture for these two representations is described in FIG. 3.

The user interface 220 may help the user guide multiple tasks in the view synthesis process. For example, the user interface 220 may allow the user to upload a video record from which a scene representation is to be built. The user may select a computer memory source and select the video record. Other aspects of the input and representation building process may be controlled through the user interface 220. The user interface can also provide functions that guide the output once the scene representation is built. For example, the user interface 220 may include controls through which a time and/or camera pose is specified. In one aspect, the user interface 220 includes an image of the scene and allows the user to select a camera pose indicated in the user interface 220. The user interface 220 may also allow the user to specify a time for the output. The user interface 220 may include a slide control showing time progress in the input video. The slide control may be bounded by the length of the input video. For example, the slide control may help the user select a time between zero and 20 seconds, if the input video is 20 seconds long. The slide control may allow a time to be selected that is not found in the input video used to build the scene representation. For example, if the frames per second (fps) of the input video is 30 fps, then the slide control might allow the output request to specify times between frames, as if the input video was 60, 90, or 120 fps.

The trainer 222 received the video record input and builds both the static scene representation 242 and the dynamic scene representation 244. Initially, the MLPs may be initialized with random values. The training may use gradient descent or some other training technique. Gradient descent is used to optimize the representation by minimizing the error between each observed image (e.g., video input frame) and the corresponding views rendered from the representation.

The motion estimator 224 provides a motion estimation for dynamic objects in a scene. The motion estimation can be used as a data prior during the process of training a neural network to build a dynamic scene representation. For example, the motion estimator can be used to help generate a photoconsistency loss, described herein. The motion estimator 224 may generate motion vectors that estimate motion for all or part of an object. The motion vectors may relate to the whole image (global motion estimation) or specific parts, such as rectangular blocks, arbitrary shaped patches or even per pixel. The motion vectors may be represented by a translational model or many other models that can approximate the motion of a real video camera, such as rotation and translation in all three dimensions and zoom.

The motion estimator 224 can use direct or indirect methods for estimating motion. Indirect methods use features, such as corner detection, and match corresponding features between frames, usually with a statistical function applied over a local or global area. The purpose of the statistical function is to remove matches that do not correspond to the actual motion. Statistical functions that have been successfully used include Random sample consensus (RANSAC). The direct methods that may be used include a block-matching algorithm, phase correlation and frequency domain methods, pixel recursive algorithms, and optical flow.

A block-matching algorithm is a way of locating matching macroblocks in a sequence of digital video frames for the purposes of motion estimation. The underlying supposition behind motion estimation is that the patterns corresponding to objects and background in a frame of video sequence move within the frame to form corresponding objects on the subsequent frame.

A block-matching algorithm involves dividing the current frame of a video into macroblocks and comparing each of the macroblocks with a corresponding block and its adjacent neighbors in a nearby frame of the video (sometimes just the previous one). A vector is created that models the movement of a macroblock from one location to another. This movement, calculated for all the macroblocks comprising a frame, constitutes the motion estimated in a frame.

Phase correlation is an approach to estimate the relative translative offset between two similar images (digital image correlation) or other data sets. It is commonly used in image registration and relies on a frequency-domain representation of the data, for example, as calculated by fast Fourier transforms.

Optical flow or optic flow is the pattern of apparent motion of objects, surfaces, and edges in a visual scene caused by the relative motion between an observer and a scene. Sequences of ordered images allow the estimation of motion as either instantaneous image velocities or discrete image displacements. The optical flow methods try to calculate the motion between two image frames that are taken at times t and t+Δt at every voxel position. These methods are called differential since they are based on local Taylor series approximations of the image signal; that is, they use partial derivatives with respect to the spatial and temporal coordinates.

The depth estimator 226 calculates a depth for objects in a dynamic scene using one or more frames of the video. The depth estimation can be used as a data prior during the process of training a neural network to build a dynamic scene representation. The depth estimator 226 may also use the camera pose data. Various methods of estimating the depth may be used. These methods include structure from motion and machine learning models. At a high level, the machine learning models may be trained to recognize depth in monocular images using corresponding stereo images. The output from the depth estimator 226 can be a 3D model of the scene or of part of a scene.

The camera pose estimator 228 calculates a camera pose for fame in a video. The camera pose can be an input to the process of training a neural network to build a dynamic scene representation. The combination of position and orientation is referred to as the pose of the camera. Various methods may be used to determine the camera pose. For example, homography calculates the rotation and translation of the camera using the same planar surface in two frames. Camera resectioning is the process of estimating the parameters of a pinhole camera model approximating the camera that produced a given photograph or video. Camera resectioning determines which incoming light is associated with each pixel on the resulting image. In an ideal pinhole camera, a simple projection matrix is enough to do this. The camera projection matrix is derived from the intrinsic and extrinsic parameters of the camera, and is often represented by the series of transformations; e.g., a matrix of camera intrinsic parameters, a 3×3 rotation matrix, and a translation vector. The camera projection matrix can be used to associate points in a camera's image space with locations in 3D world space.

Various method of finding the camera pose through structure by motion operations may be used. Finding structure from motion presents a similar problem to finding structure from stereo vision. In both instances, the correspondence between images and the reconstruction of 3D object needs to be found. To find correspondence between images, features such as corner points (edges with gradients in multiple directions) are tracked from one image to the next. One of the most widely used feature detectors is the scale-invariant feature transform (SIFT). It uses the maxima from a difference-of-Gaussians (DOG) pyramid as features. The first step in SIFT is finding a dominant gradient direction. To make it rotation-invariant, the descriptor is rotated to fit this orientation. The features detected from all the images will then be matched. One of the matching algorithms that track features from one image to another is the Lukas-Kanade tracker. The feature trajectories over time are then used to reconstruct their 3D positions and the camera's motion. An alternative is given by direct approaches, where geometric information (3D structure and camera motion) is directly estimated from the images, without intermediate abstraction to features or corners.

The scene representation 240 may be implemented using Neural Radiance Fields (NeRFs), which represent a static scene as a radiance field defined over a bounded 3D volume. This radiance field, denoted $F_\Theta$, is defined by a set of parameters $\Theta$ that are optimized to reconstruct the input views. In NeRF, $F_\Theta$ is a multilayer perceptron (MLP) that takes as input a position (x) and viewing direction (d), and produces as output a volumetric density ($\sigma$) and RGB color (c):

$$(c, \sigma) = F_\Theta(x, d) \quad (1)$$

To render the color of an image pixel, NeRF approximates a volume rendering integral. Let r be the camera ray emitted from the center of projection through a pixel on the image plane. The expected color $\hat{C}$ of that pixel is then given by:

$$\hat{C}(r) = \int_{t_n}^{t_f} T(t) \sigma(r(t)) c(r(t), d) dt$$

where $$T(t) = \exp(-\int_{t_n}^{t} \sigma(r(s)) ds) \quad (2)$$

Intuitively, T(t) corresponds to the accumulated transparency along the ray. The loss is then the difference between the expected color $\hat{C}$, and the ground truth color C corresponding to the pixel that ray originated from r:

$$\mathcal{L}_{static} = \Sigma_r \|\hat{C}(r) - C(r)\|_2^2 \quad (3)$$

To capture dynamics, the technology described herein extends the static scenario described in Eq. 1 by including time in the domain and explicitly modeling 3D motion as scene flow fields. For a given 3D point x and time i, the model predicts not just reflectance and opacity, but also forward and backward 3D scene flow $\mathcal{F}_i = (f_{i \to i+1}, f_{i \to i-1})$, whichwhich denote 3D offset vectors that point to the position of x at times i+1 and i−1 respectively. The model assumes that movement that occurs between observed time instances is linear. To handle disocclusions in 3D space, the model also predicts disocclusion weights $\mathcal{W}_i = (w_{i \to i+1}, w_{i \to i-1})$. The dynamic model is thus defined as $$(c_i, \sigma_i, \mathcal{F}_i, \mathcal{W}_i) = F_\Theta^{dy}(x, d, i) \quad (4)$$

Note that for convenience, the subscript i is used to indicate a value at a specific time i.

Temporal photometric consistency may be used to model the scene flow between neighboring video frames. The motion estimates of the motion estimator 224 may be used as an input to photometric consistency process. A new loss enforces that the scene at time i should be consistent with the scene at neighboring times $j \in \mathcal{N}(i)$ when accounting for motion that occurs due to 3D scene flow. To do this, the technology volume renders the scene at time i from 1) the perspective of the camera at time i and 2) with the scene warped from j to i, to undo any motion that occurred between i and j. The perspective of the camera may be described as the camera pose and provided by the camera pose estimator 228, described previously. The volume rendering may be accomplished by warping each 3D sampled point location $x_i$ along a ray $r_i$ during volume tracing using the predicted scene flows fields $\mathcal{N}_i$ to look up the RGB color $c_j$ and opacity $\sigma_j$, from neighboring time j. This yields a rendered image, denoted $\hat{C}_{j \to i}$, of the scene at time j with both camera and scene motion warped to time i:

$$\hat{C}_{j \to i}(r_i) = \int_{t_n}^{t_f} T_j(t) \sigma_j(r_{j \to i}(t)) c_j(r_{j \to i}(t), d_i) dt$$

where $$r_{j = i}(t) = r_i(t) + f_{j \to i}(r_i(t)) \quad (5)$$

The technology minimizes the mean squared error (MSE) between each warped rendered view and the ground truth view:

$$\mathcal{L}_{pho} = \Sigma_{r_i} \Sigma_{j \in \mathcal{N}(i)} \|\hat{C}_{j \to i}(r_i) - C_i(r_i)\|_2^2 \quad (6)$$

This loss is not valid at 3D disocculusion regions caused by motion. Analogous to 2D optical flow, there is no correct scene flow when a 3D location becomes occluded or disoccluded between frames. These regions are especially important as they occur at the boundaries of moving objects. To mitigate errors due to this ambiguity, the technology described herein predicts two extra continuous disocclusion weight fields $s_{i \to i+1}$, and $w_{i \to i-1} \in [0,1]$ corresponding to $(f_{i \to i+1})$ and $(f_{i \to i-1})$ respectively. These weights serve as an unsupervised confidence of where the temporal photoconsistency loss should be applied. Ideally, they should be low at disocclusions and close to 1 everywhere else. The technology applies these weights by volume rendering the weight along the ray $r_i$ with opacity from time j, and multiplying the accumulated weight at each 2D pixel:

$$\hat{W}_{j \to i}(r_i) = \int_{t_n}^{t_f} T_j(t) \sigma_j(r_{j \to i}(t)) w_{i \to j}(r_i(t)) dt \quad (7)$$

The trivial solution where all predicted weights are zero can be avoided by adding $\ell_1$ regularization to encourage predicted weights to be close to one, giving a new weighted loss:

$$\mathcal{L}_{pho} = \sum_{r_i} \sum_{j \in \mathcal{N}(i)} \hat{W}_{j \to i}(r_i) \|\hat{C}_{j \to i}(r_i) - C_i(r_i)\|_2^2 + \beta_w \sum_{x_i} \|w_{i \to j}(x_i) - 1\|_1 \quad (8)$$

where $\beta_w$ is a regularization weight that may be set to 0.1. We use $\mathcal{N}(i) = \{i, i \pm 1, i \pm 2\}$, and chain scene flow and disocclusion weights for the i±2 case. When j=i, there is no scene flow warping or disocculusion weights involved ($f_{i \to j} = 0$, $\hat{W}_{j \to i} = 1$), meaning that $\hat{C}_{i \to j}(r_i) = \hat{C}(r_i)$.

Scene flow priors may be used by the trainer 222 to optimize the dynamic scene representation. To regularize the predicted scene flow fields, an additional 3D scene flow cycle consistency term may be added to encourage that at all sampled 3D points $x_i$, the predicted forward scene flow $f_{i \to j}$ is consistent with the backward scene flow $f_{j \to i}$ at the corresponding location sampled at time j (i.e. at position $x_{i \to j} = x_i + f_{i \to j}$). This cycle consistency is also only valid outside 3D disocclusion regions and the same predicted disocclusion weights can be used to modulate this term, giving equation (9):

$$\mathcal{L}_{cyc} = \Sigma_{x_i} \Sigma_{j \in \mathcal{N}(i)} w_{i \to j} \|f_{i \to j}(x_i) + f_{j \to i}(x_{i \to j})\|_1 \quad (9)$$

A low-level regularization $\mathcal{L}_{reg}$ can be added on the predicted scene flow as an optimization. First, scene flow spatial smoothness may be enforced by minimizing the $\ell_1$ difference $\mathcal{L}_{sp}$ between scenes flows sampled at neighboring 3D position along each ray. Second, the technology enforces scene flow temporal smoothness $\mathcal{L}_{temp}$ by encouraging 3D point trajectories to be piece-wise linear. Finally, scene flow may be encouraged to be small $\mathcal{L}_{min}$ in most places by applying an $\ell_1$ regularization term, since motion is isolated to dynamic objects. All terms may be weighted: $\mathcal{L}_{reg}=\mathcal{L}_{sp}+\mathcal{L}_{temp}+\mathcal{L}_{min}$, corresponding to spatial smoothness, temporal smoothness, and small scene flow. Scene flow spatial smoothness minimizes the weighted $\ell_1$ difference between scenes flows sampled at neighboring 3D position along each ray $r_i$. In particular, the spatial smoothness term is written as:

$$\mathcal{L}_{sp} = \Sigma_{x_i} \Sigma_{y_i \in \mathcal{N}(x_i)} \Sigma_{j_i \in (i+1)} w^{dist}(x_i, y_i) \|f_{i \to j}(x_i) - f_{i \to j}(y_i)\|_1 \quad (10)$$

Where $\mathcal{N}(x_i)$ is the neighboring points of $x_i$ sampled along the ray $r_i$, and weights are computed by the Euclidean distance between the two points: $w^{dist}(x, y) = \exp(-2\|x-y\|_2)$.

Scene flow temporal smoothness encourages 3D point trajectories to be piece-wise linear. This is equivalent to minimizing sum of forward scene flow and backward scene flow from each sampled 3D point along the ray:

$$\mathcal{L}_{temp} = \frac{1}{2} \Sigma_{x_i} \|f_{i \to i+1}(x_i) + f_{i \to i-1}(x_i)\|_x^2 \quad (11)$$

Finally, the technology encourages scene flow to be minimal in most of 3D space by applying a $l_1$ regularization term to each predicted scene flow:

$$\mathcal{L}_{min} = \Sigma_{x_i} \Sigma_{j \in (i \pm 1)} \|f_{i \to j}(x_i)\|_1 \quad (12)$$

The trainer 222 may incorporate data-drive priors into the training. Since reconstruction of dynamic scenes with a monocular camera is challenging, the above losses can on occasion converge to sub-optimal local minima when randomly initialized. A geometric consistency prior and a single-view depth prior may be used to prevent this convergence. The data driven priors maybe expressed as: $\mathcal{L}_{data} = \mathcal{L}_{geo} + \beta_z \mathcal{L}_z$. $\beta_z$ can equal 2.

The geometric consistency prior minimizes the reprojection error of scene flow displaced 3D points with respect to the derived 2D optical flow, which may be computed using FlowNet2. Suppose $p_i$ is a 2D pixel position at time i. The corresponding 2D pixel location in the neighboring frame at time j displaced through 2D optical flow $u_{i \to j}$ can be computed as $p_{i \to j} = p_i + u_{i \to j}$.

To estimate the expected 2D point location $\hat{p}_{i \to j}$ at time j displaced by predicted scene flow fields, the technology may first compute the expected scene flow $\hat{F}_{i \to j}(r_i)$ and expected 3D point location $\hat{X}_i(r_i)$ of the ray $r_i$ through volume rendering.

$$\hat{F}_{i \to j}(r_i) = \int_{t_n}^{t_f} T_i(t) \sigma_i(r_i(t)) f_{i \%43 j}(r_i(t)) dt \quad (13)$$

$$\hat{X}_i(r_i) = \int_{t_n}^{t_f} T_i(t) \sigma_i(r_i(t)) x_i(r_i(t)) dt \quad (14)$$

$\hat{p}_{i \to j}$ is then computed by performing perspective projection of the expected 3D point location displaced by the scene flow (i.e. $\hat{X}_i(r_i) + \hat{F}_{i \to j}(r_i)$) into the viewpoint corresponding to the frame at time j:

$$\hat{p}_{i \to j}(r_i) = \pi(K(R^j(\hat{X}^i(r_i) + \hat{F}_{i \to j}(r_i)) + t^j)) \quad (15)$$

where $(R^j, t^j) \in SE(3)$ are rigid body transformations that transform 3D points from the world coordinate system to the coordinate system of frame at time j. K is a camera intrinsic matrix shared among all the frames, and $\pi$ is perspective division operation. The geometric consistency is computed as the $\ell_1$ difference between $\hat{p}_{i \to j}$ and $p_{i \to j}$.

$$\mathcal{L}_{geo} = \Sigma_{r_i} \Sigma_{j \in \mathcal{N}(i)} \|\hat{p}_{i \to j}(r_i) - p_{i \to j}(r_i)\|_1 \quad (16)$$

A depth estimation computed by the depth estimator 226 can be used during training. A single view depth prior can be added that encourages the expected termination depth $\hat{Z}_i$ computed along each ray to be close to the depth $Z_i$ predicted from a pre-trained single view depth network, as described with reference to the depth estimator 226. As single-view depth predictions are defined up to an unknown scale and shift, the technology may utilize a robust scale-shift invariant loss:

$$\mathcal{L}_z = \Sigma_{r_i} \|\hat{Z}^*_i(r_i) - Z^*_i(r_i)\|_1 \quad (17)$$

The technology described herein may normalize the depths to have zero translation and unit scale using robust estimator:

$$\hat{Z}^*_i(r_i) = \frac{Z(r_i) - \text{shift}(Z)}{\text{scale}(Z)} \quad (18)$$

where shift(Z)=median(Z), scale(Z)=mean(|Z−shift(Z)|). In one aspect, the depth is not normalized during training for the purpose of resource management. As a result, the depth value is normalized using the shift and scale estimate from current sampled points in each training iteration. Furthermore, since the entire scene is reconstructed in normalized device coordinate (NDC) space, and the Mixed-data sampling (MiDAS) model predicts disparity in Euclidean space with an unknown scale and shift, the embodiments can use the NDC ray space derivation from NeRF to derive that the depth in NDC space is equal to negative disparity in Euclidean space up to scale and shift, so our single-view term is implemented as:

$$\mathcal{L}_z = \sum_{r_i} \left\| \hat{Z}^*_i(r_i) + \frac{1^*}{Z_i}(r_i) \right\|_1 \quad (19)$$

The data-driven priors help the model learn correct scene geometry especially for dynamic regions. However, as both of these data-driven priors can be noisy (rely on inaccurate or incorrect predictions), in one aspect, these are used for initialization only, and linearly decay the weight of $\mathcal{L}_{data}$ to zero during training for a fixed number of iterations, such as 1000.

Warping-based temporal loss may be used in a local temporal neighborhood $\mathcal{N}_i$, as dynamic components typically undergo too much deformation to reliably infer correspondence over larger temporal gaps. Rigid regions, however, should be consistent and observations of rigid regions from all frames in an input video may be used to model these regions. Therefore, we propose to combine our dynamic (time-dependent) scene representation with a static (time-independent) one, and require that when combined, the resulting volume traced images match the input frames.

We model each representation with its own MLP, where the dynamic scene component (e.g., dynamic scene representation 244) is represented with Eq. 4, and the static one (e.g., static scene representation 242) is represented as a variant of Eq. 1:

$$(c, \sigma, v) = F_\Theta(x, d) \quad (20)$$

where v is an unsupervised 3D blending weight field, that linearly blends the RGB σ from static and dynamic scene representations along each ray. Intuitively, v should assign a low weight to the dynamic representation at rigid regions, as these can be rendered in higher fidelity by the static representation, while assigning a lower weight to the static representation in regions that are moving, as these can be better modeled by the dynamic representation. Adding the extra may lead to better results and more stable convergence than the configuration without v. The combined rendering equation is then written as:

$$\hat{C}_i^{cb}(r_i) = \int_{t_n}^{t_f} \hat{T}_i^{cb}(t) \sigma_i^{cb}(t) c_i^{cb}(t) dt \tag{21}$$

Where $\sigma_i^{cb}(t) c_i^{cb}(t)$ is a linear combination of static and dynamic scene components, weighted by v(t):

$$\sigma_i^{cb}(t) c_i^{cb}(t) = v(t) c(t) \sigma(t) + (1 - v(t)) c(t) \sigma(t) \tag{22}$$

The combined rendering equation 21 may be approximated using the quadrature approximations technique. Suppose $\{t^l\}_{l=1}^{L}$ are the points sampled within the near and far bounds and the distance between every sampled points is denoted $\delta^l = t^{l+1} - t^l$, the discrete approximation of equation 21 is then written as:

$$\hat{C}_i^{cb}(r_i) = \sum_{l=1}^{L} T_i^{cb}(t^l) \big( v(t^l) \alpha(\sigma(t^l) \delta^l) c(t^l) + (1 + v(t^l)) \alpha(\sigma_i(t^l) \delta^l) c_i(t^l) \big),$$

Where $T_i^{cb}(t^l) = \exp\big(-\sum_{l'=1}^{i-1} v(t^l) \sigma(t^l) + (1 - v(t^{l'})) \alpha(\sigma_i(t^{l'}) \delta_i)\big),$ And $\alpha(x) = 1 - \exp(-x)$ For clarity, the technology may omit $r_i$ in each prediction. The MLP is then trained with the combined scene representation by minimizing MSE between $\hat{C}_i^{cb}$ with corresponding input view:

$$\mathcal{L}_{cb} = \Sigma_{r_i} \|\hat{C}_i^{cb}(r_i) - C_i^{cb}(r_i)\|_2^2 \tag{23}$$

This loss is added to the previously defined losses on the dynamic representation, giving us the final combined loss:

$$\mathcal{L} = \mathcal{L}_{cb} + \mathcal{L}_{pho} + \beta_{cyc} \mathcal{L}_{cyc} + \beta_{data} \mathcal{L}_{data} + \beta_{reg} \mathcal{L}_{reg} \tag{24}$$

where the β coefficients weight each term.

The static scene representation 242 may be a MLP trained to represent static features of a scene. The static scene representation 242 is described in more detail with reference to FIG. 3. As the represented elements are static, time may be omitted as an input or output parameter of the static scene representation 242.

The dynamic scene representation 244 may be a MLP trained to represent dynamic features of a scene. As such, time is an input to the dynamic scene representation 244 for both training and output purposes. The output of the dynamic scene representation 244 at a time and/or camera pose may be combined with an output from the static scene representation 242 at the same camera pose to render an image of the dynamic scene from the perspective of the camera pose.

The rendering engine 250 renders the dynamic scene from a specified view at a specified time. The rendering may be of a single video frame (i.e., an image). The view may be novel and the time may be novel. A novel view is a view not found in the video used to build the dynamic scene representation. The view may be thought of as a camera pose. In other words, the novel view depicts the scene from a camera pose not associated with any of the video frames in the video used to build the scene representation. Alternatively, the novel view may be the same as a camera pose found in the input video, but at a different time (e.g., frame) than when the camera pose occurred. The time may also be novel. For example, the time may be before or after the video or between frames.

Rendering is a process of generating an image from a 2D or 3D model using a computer program. The rendering may be performed from a scene file that defines scene features such as the model itself, texture, shading, shadows, reflection, lighting, and viewpoint. The features may be processed by the rendering engine 250 to output an image. The processing may involve solving a rendering equation given the scene features.

As mentioned, the dynamic scene representation may be described as a volume and the rendering engine 250 performs a volume rendering to output an image from a specified view and time. Volume rendering is a set of a technique used to display a 2D projection of a 3D discretely sampled data set.

The volume in the dynamic scene representation can comprise a prediction of the RGBα (Red, Green. Blue, Alpha→it stands for opacity channel) for every voxel. Each voxel is part of the continuous function that defines the representation.

A starting point for the rendering process can be a specified camera pose or view and a time. The output is the radiance emitted in each direction (θ; Φ) at each point (x; y; z) in space at time i, and a density at each point which acts like a differential opacity controlling how much radiance is accumulated by a ray passing through (x; y; z) at time i. Thus, rendering can comprise collecting the radiance emitted across the dynamic scene from a specified view and time and then processing the radiance to render an image. The radiance can be a combination of the radiance from the static representation and the dynamic representation combined by a weighting function.

To render novel views at a given time, the technology can volume render each pixel using Eq. 5 (dynamic) or Eq. 22 (static+dynamic). This approach produces good results at times corresponding to input views. If a novel time is requested that does not correspond to a time associated with any of the input frames, then a different rendering method may be used.

The technology described herein may render intermediate times by warping the scene based on the predicted scene flow. For efficient rendering, the technology may use a splatting-based plane-sweep volume tracing approach. To render an image at intermediate time $i+\delta_i$, $\delta_i \in (0,1)$ at a specified target viewpoint, a plane may be swept over every ray emitted from the target viewpoint from front to back. At each sampled step t along the ray, point information may be queried through the model at both times i and i+1, and displace all 3D points at time i by the scaled scene flow $x_i + \delta_i$ $f_{i \to i+1}(x_1)$, and similarity for time i+1. The technology then splats the 3D displaced points onto a (c, α) accumulation buffer at the target viewpoint, and blend splats from time i and i+1 with linear weights $1-\delta_i$, $\delta_i$. The final rendered view may then be obtained by volume rendering the accumulation buffer.

Figure 3:
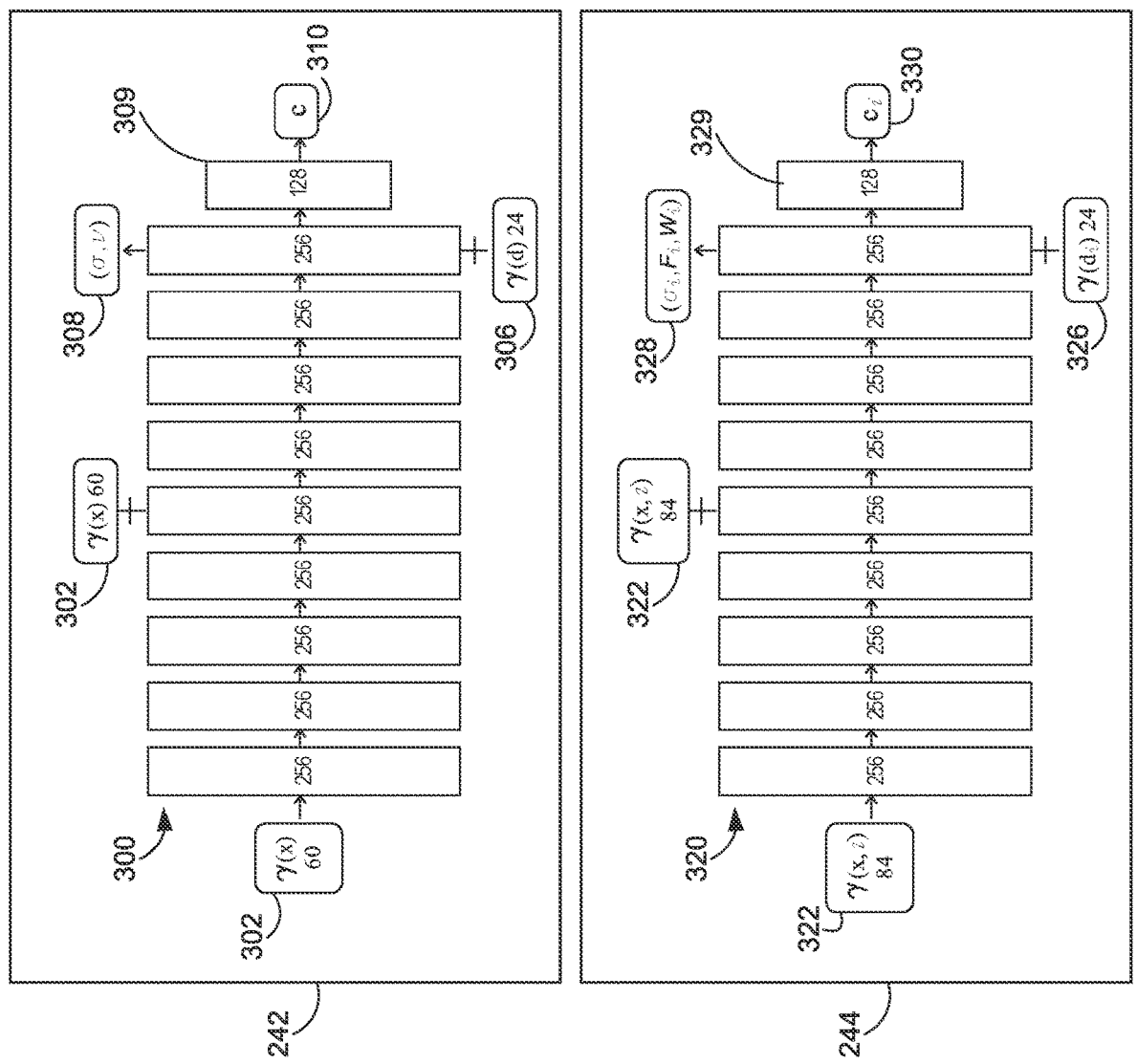
FIG. 3 is an illustration of a neural network architecture suitable for storing a representation of a dynamic scene, in accordance with embodiments of the technology described herein.

FIG. 3 shows an architecture for the static scene representation 242 and the dynamic scene representation 244, in accordance with aspects of the technology described herein. The architecture of the static scene representation 242 comprises a MLP with a plurality of hidden layers 300. Ten layers are shown in this example. In one aspect, each of the hidden layers is a fully connected layer. The number inside the layer indicates the layer's dimensions. Some of the layers may comprise a rectified linear activation function (ReLU activation). In one aspect, the first 8 layers, starting from the input vector 302 on the left and moving right, have a ReLU activation. Thus, in one aspect the positional encoding of the input location (y(x)) 302 is passed through 8 fully-connected ReLU layers, each with 256 channels. The positional encoding of the input location (y(x)) 302 can be input a second time at the fifth layer. A skip connection can be used to concatenate this input 302 to the fifth layer's activation.

In one aspect, there may be no activation between the eighth and ninth layers. A final layer 309 (with a sigmoid activation) outputs the emitted RGB radiance 310 at position x, as viewed by a ray with direction d. The ninth layer outputs 308 the opacity σ and a blending weight v. An additional output of the ninth layer may be concatenated with an encoding of the input 306 viewing direction (e.g., camera pose) and provided to the final layer 309. The end result is the MLP representation predicts the output 308 opacity as a function of only the location x, while allowing the RGB color c 310 to be predicted as a function of both location and viewing direction. The final output of the representation may be a ray formed from the emitted RGB radiance 310 and the opacity output 308. The ray may be used to render a single pixel. In order to render a single image, the representation may be queried thousands or even millions of times and the output of these queries combined to form a rendered image.

The architecture of the dynamic scene representation 244 comprises a MLP having a plurality of hidden layers 320. Ten layers are shown in this example. In one aspect, each of the hidden layers is a fully connected layer. The number inside the layer indicates the layer's dimensions. Some of the layers may have a ReLU activation. In one aspect, the first 8 layers, starting from the input vector 322 on the left and moving right, have a ReLU activation. Thus, in one aspect the positional encoding of the input location and time (γ(x, i)) 322 is passed through 8 fully-connected ReLU layers, each with 256 channels. The positional encoding of the input location and time (y(x, i)) 322 is input again at the fifth layer. A skip connection can be used to concatenate this input 322 to the fifth layer's activation.

In one aspect, there may be no activation between the eighth and ninth layers. A final layer 329 (with a sigmoid activation) outputs the emitted RGB radiance 330 at position x and time i, as viewed by a ray with direction $d_i$. The ninth layer outputs 328 the opacity $σ_i$, scene flow $\mathcal{F}_i$, and disocculusion weight fields $\mathcal{W}_i$. An additional output of the ninth layer may be concatenated with an encoding of the input viewing direction (e.g., camera pose) and provided to the final layer 329. The end result is the MLP representation predicting the volume density 328 as a function of only the location x and time, while allowing the RGB color $c_i$ 310 to be predicted as a function of both location, time and viewing direction. The final output of the representation may be a ray formed from the emitted RGB radiance 330 and the output 328. The ray may be used to render a single pixel. In order to render a single image, the representation may be queried thousands or even millions of times and the output of these queries combined to form a rendered image.

Figure 4:
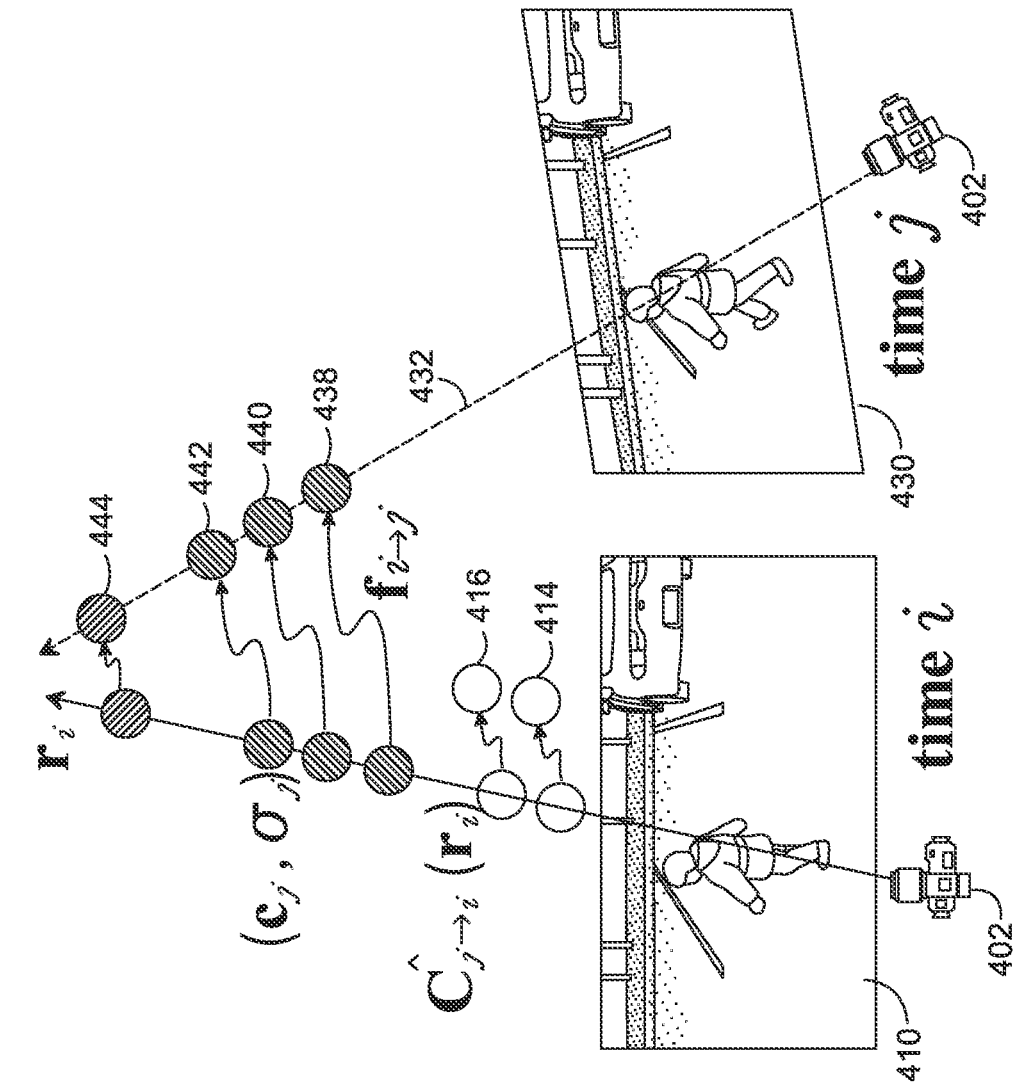
FIG. 4 is an illustration of a rays modeled in a dynamic scene representation, in accordance with embodiments of the technology described herein.

FIG. 4, scene warping is illustrated, according to aspects of the technology described herein. To render a frame at time i, the technology performs volume tracing along ray $r_i$ 412 with RGBσ at time i, resulting in the predicted pixel colors $\hat{C}_i(r_i)$. In this example, σ indicates the camera pose 402. In fact, the ray tracing process may be repeated thousands of times from a designated camera pose and the resulting rays utilized to render an image. The dots (414, 416, 418, 420, 422, and 424) represent scene colors and corresponding opacities at different depths along the ray 412. For example, assuming the ray 412 intersects the walking boy, dot 414 and dot 416 may be colorless and transparent because the ray has not yet intersected an object in the scene. The dots 418, 420, and 422 may be the color (e.g., yellow) of the boy's raincoat. The final dot 424 might be the color of the pavement (e.g., black). When rendered, the raincoat dots would occlude the pavement dot 424 and corresponding pixel(s) would be rendered in the color yellow.

To warp the scene from time j to i, the technology offsets each step (e.g., color dot) along r using scene flow $f_{i \to j}$ and volume trace with the associated color and opacity ($c_j$, $σ_j$). The slight differences between the first scene image 410 and second scene image 430 illustrate the intuition behind the scene warping. For example, the boy in the picture appears to be walking to the left away from the car and towards the parking space line. Accordingly, the movement $f_{i \to j}$ between color dots is indicative of the boy's movement. As can be seen, dots 438, 440, 442, and 444 all move by $f_{i \to 1}$ to form $r_j$ 432.

Exemplary Methods

Figure 5:
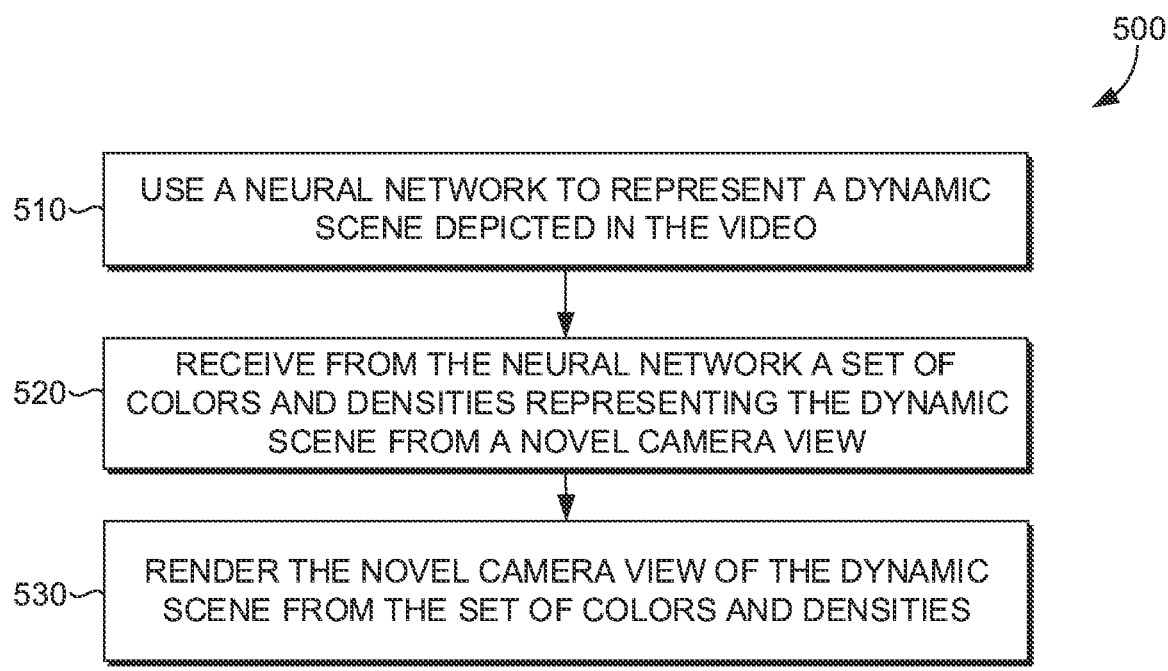
FIG. 5 provides a first example method of synthesizing a view of a dynamic scene, in accordance with embodiments of the technology described herein.
Figure 6:
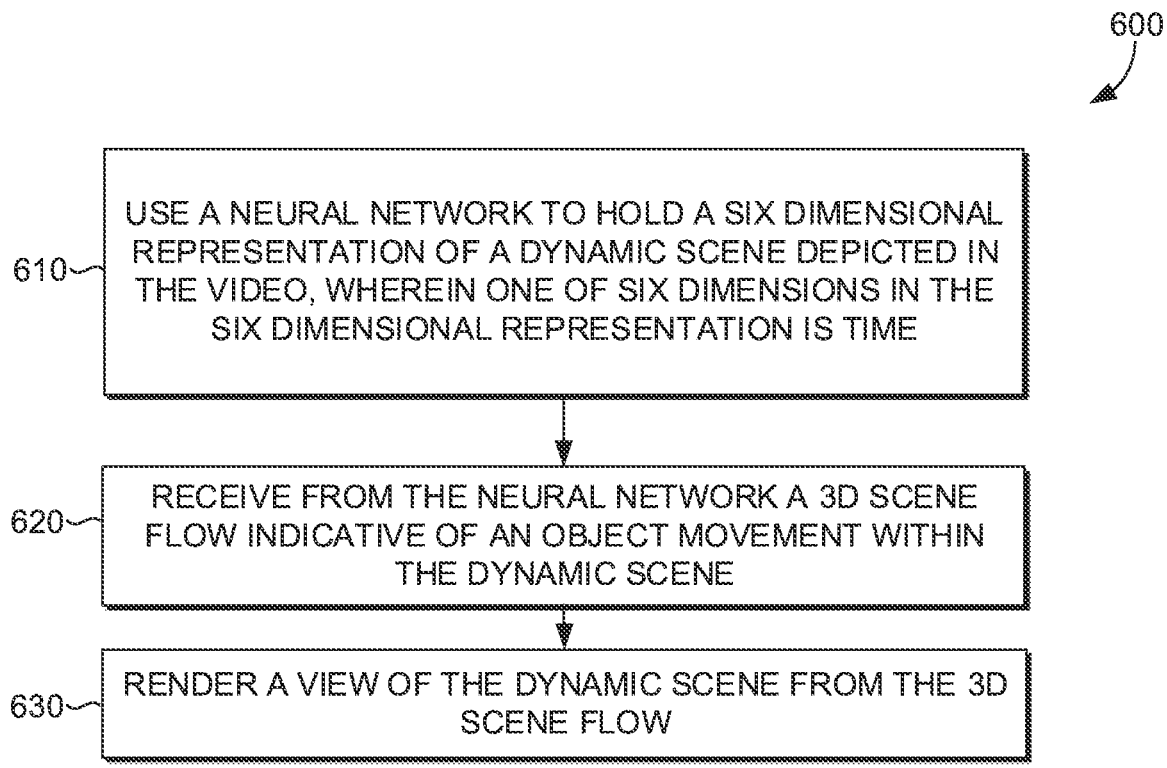
FIG. 6 provides a second example method of synthesizing a view of a dynamic scene, in accordance with embodiments of the technology described herein.
Figure 7:
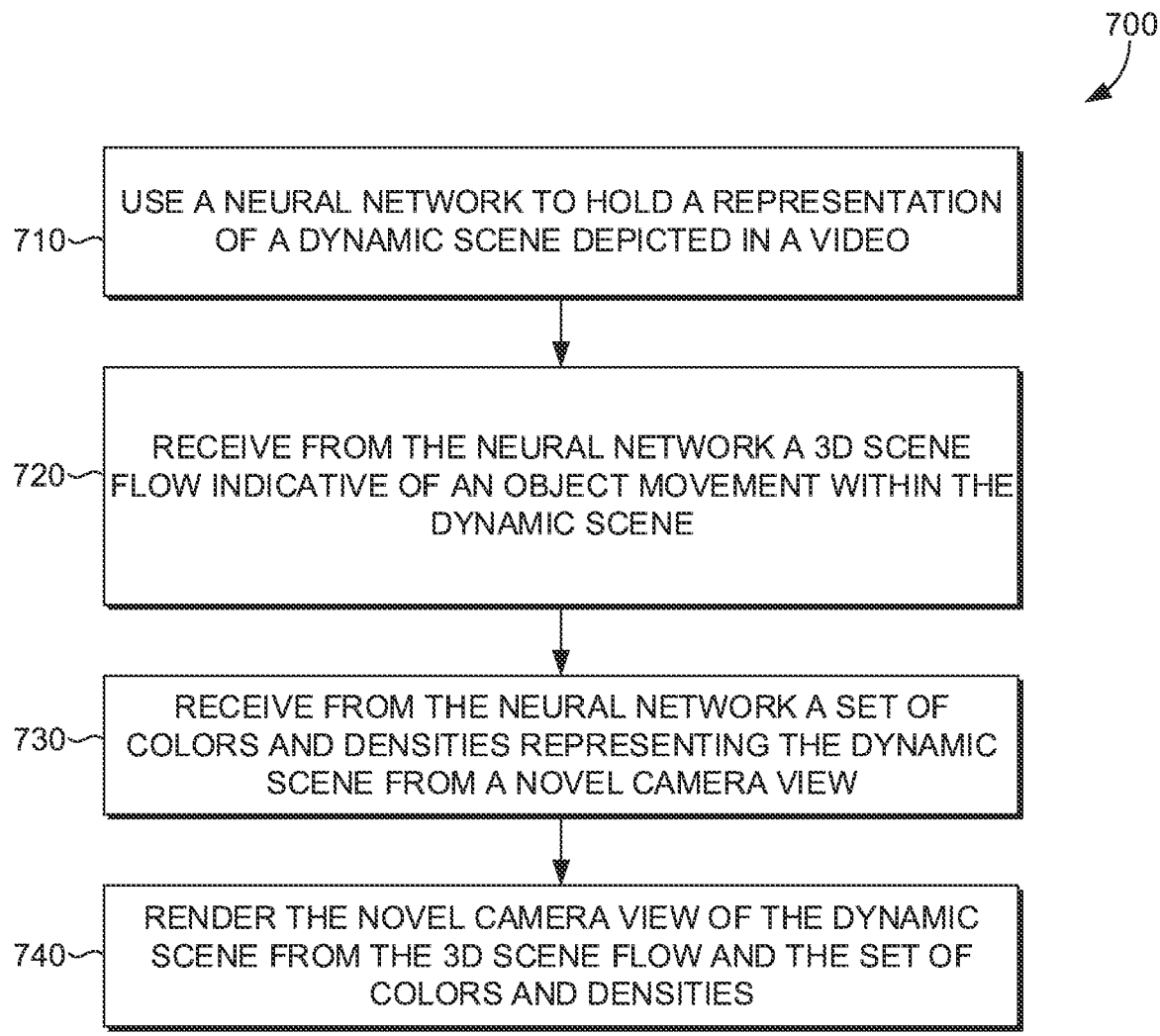
FIG. 7 provides a third example method of synthesizing a view of a dynamic scene, in accordance with embodiments of the technology described herein.

Now referring to FIGS. 5-7, each block of methods 500, 600, and 700, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The method may be provided by a standalone application, a service or hosted service (standalone or in combination with another hosted service), or a plug-in to another product, to name a few. In addition, methods 500, 600, and 700 are described, by way of example, with respect to the view synthesis engine 110 of FIG. 2 and additional features of FIGS. 3 and 4. However, these methods may additionally or alternatively be executed by any one system, or any combination of systems, including, but not limited to, those described herein.

FIG. 5 is a flow diagram showing a method 500 for synthesizing a view of a dynamic scene, in accordance with some embodiments of the present disclosure. The method 500, at block 510 includes using a neural network to represent a dynamic scene depicted in a video.

The method 500, at block 520 includes receiving from the neural network a set of colors and densities representing the dynamic scene from a novel camera view.

The method 500, at block 530 includes rendering the novel camera view of the dynamic scene from the set of colors and densities. The rendering may be of a single video frame (i.e., an image). The view may be novel and the time may be novel. A novel view is a view not found in the video used to build the dynamic scene representation. The view may be thought of as a camera pose. In other words, the novel view depicts the scene from a camera pose not associated with any of the video frames in the video used to build the scene representation. Alternatively, the novel view may be the same as a camera pose found in the input video, but at a different time (e.g., frame) than when the camera pose occurred. The time may also be novel. For example, the time may be before or after the video or between frames.

The rendered view may be output for display through a viewing device, such as a smartphone, tablet or laptop. The rendered view may be communicated over a network to a viewing device.

FIG. 6 is a flow diagram showing a method 600 for synthesizing a view of a dynamic scene, in accordance with some embodiments of the present disclosure. The method 600, at block 610 includes using a neural network to hold a six dimensional representation of a dynamic scene depicted in a video, wherein one of six dimensions in the six dimensional representation is time.

The method 600, at block 620 includes receiving from the neural network a 3D scene flow indicative of an object movement within the dynamic scene.

The method 600, at block 630 includes rendering a view of the dynamic scene from the 3D scene flow. The rendered view may be output for display through a viewing device, such as a smartphone, tablet or laptop. The rendered view may be communicated over a network to a viewing device.

FIG. 7 is a flow diagram showing a method 700 for synthesizing a view of a dynamic scene, in accordance with some embodiments of the present disclosure.

The method 700, at block 710 includes using a neural network to hold a representation of a dynamic scene depicted in a video.

The method 700, at block 720 receiving from the neural network a 3D scene flow indicative of an object movement within the dynamic scene.

The method 700, at block 730 receiving from the neural network a set of colors and densities representing the dynamic scene from a novel camera view.

The method 700, at block 740 rendering the novel camera view of the dynamic scene from the 3D scene flow and the set of colors and densities. The rendering may be of a single video frame (i.e., an image). The view may be novel and the time may be novel. A novel view is a view not found in the video used to build the dynamic scene representation. The view may be thought of as a camera pose. In other words, the novel view depicts the scene from a camera pose not associated with any of the video frames in the video used to build the scene representation. Alternatively, the novel view may be the same as a camera pose found in the input video, but at a different time (e.g., frame) than when the camera pose occurred. The time may also be novel. For example, the time may be before or after the video or between frames.

The rendered view may be output for display through a viewing device, such as a smartphone, tablet or laptop. The rendered view may be communicated over a network to a viewing device.

Exemplary Operating Environment

Figure 8:
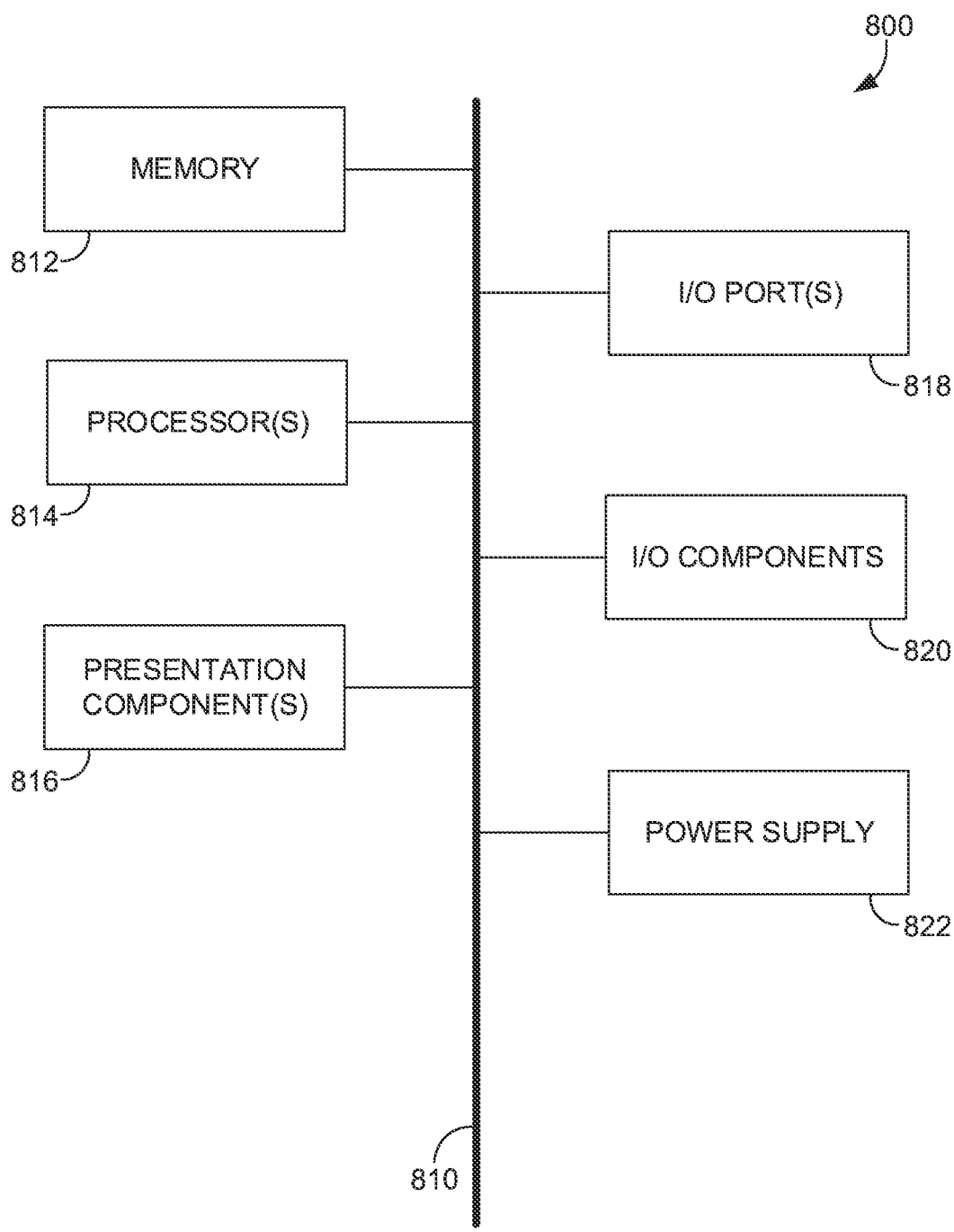
FIG. 8 is a block diagram of an example computing environment suitable for use in implementing embodiments of the technology described herein.

Having briefly described an overview of embodiments of the present invention, an example operating environment in which embodiments of the present invention may be implemented is described below in order to provide a general context for various embodiments of the present invention. Referring initially to FIG. 8 in particular, an example operating environment for implementing embodiments of the present invention is shown and designated generally as computing device 800. Computing device 800 is but one example of a suitable computing environment and is not intended to suggest any limitation as to the scope of use or functionality of the invention. Neither should computing device 800 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 8, computing device 800 includes bus 810 that directly or indirectly couples the following devices: memory 812, one or more processors 814, one or more presentation components 816, input/output ports 818, input/output components 820, and illustrative power supply 822. Bus 810 represents what may be one or more buses (such as an address bus, data bus, or combination thereof). The various blocks of FIG. 8 are shown with lines for the sake of conceptual clarity, and other arrangements of the described components and/or component functionality are contemplated. For example, one may consider a presentation component such as a display device to be an I/O component. In addition, processors have memory. We recognize that such is the nature of the art, and reiterate that the diagram of FIG. 8 is merely illustrative of an example computing device that can be used in connection with one or more embodiments of the present invention. Distinction is not made between such categories as "workstation," "server," "laptop," "hand-held device," etc., as all are contemplated within the scope of FIG. 8 and reference to "computing device."

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 800. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 812 includes computer storage media in the form of volatile and/or nonvolatile memory. The memory may be removable, non-removable, or a combination thereof. Exemplary hardware devices include solid-state memory, hard drives, optical-disc drives, etc. Computing device 800 includes one or more processors that read data from various entities such as memory 812 or I/O components 820. Presentation component(s) 816 present data indications to a user or other device. Exemplary presentation components include a display device, speaker, printing component, vibrating component, etc.

I/O ports 818 allow computing device 800 to be logically coupled to other devices including I/O components 820, some of which may be built in. Illustrative components include a microphone, joystick, game pad, satellite dish, scanner, printer, wireless device, etc.

With reference to the technical solution environment described herein, embodiments described herein support the technical solution described herein. The components of the technical solution environment can be integrated components that include a hardware architecture and a software framework that support constraint computing and/or constraint querying functionality within a technical solution system. The hardware architecture refers to physical components and interrelationships thereof, and the software framework refers to software providing functionality that can be implemented with hardware embodied on a device.

The end-to-end software-based system can operate within the system components to operate computer hardware to provide system functionality. At a low level, hardware processors execute instructions selected from a machine language (also referred to as machine code or native) instruction set for a given processor. The processor recognizes the native instructions and performs corresponding low-level functions relating, for example, to logic, control and memory operations. Low-level software written in machine code can provide more complex functionality to higher levels of software. As used herein, computer-executable instructions includes any software, including low level software written in machine code, higher level software such as application software and any combination thereof. In this regard, the system components can manage resources and provide services for system functionality. Any other variations and combinations thereof are contemplated with embodiments of the present invention.

By way of example, the technical solution system can include an API library that includes specifications for routines, data structures, object classes, and variables may support the interaction between the hardware architecture of the device and the software framework of the technical solution system. These APIs include configuration specifications for the technical solution system such that the different components therein can communicate with each other in the technical solution system, as described herein.

The technical solution system can further include a machine-learning system. A machine-learning system may include machine-learning tools and training components. Machine-learning systems can include machine-learning tools that are utilized to perform operations in different types of technology fields. Machine-learning systems can include pre-trained machine-learning tools that can further be trained for a particular task or technological field. At a high level, machine learning is a field of study that gives computers the ability to learn without being explicitly programmed. Machine learning explores the study and construction of machine-learning tools, including machine-learning algorithm or models, which may learn from existing data and make predictions about new data. Such machine-learning tools operate by building a model from example training data in order to make data-driven predictions or decisions expressed as outputs or assessments. Although example embodiments are presented with respect to a few machine-learning tools, the principles presented herein may be applied to other machine-learning tools. It is contemplated that different machine-learning tools may be used, for example, Logistic Regression (LR), Naive-Bayes, Random Forest (RF), neural networks (NN), matrix factorization, and Support Vector Machines (SVM) tools may be used for addressing problems in different technological fields.

In general, there are two types of problems in machine-learning: classification problems and regression problems. Classification problems, also referred to as categorization problems, aim at classifying items into one of several category values (for example, is this email SPAM or not SPAM). Regression algorithms aim at quantifying some items (for example, by providing a value that is a real number). Machine-learning algorithms can provide a score (e.g., a number from 1 to 100) to qualify one or more products as a match for a user of the online marketplace. It is contemplated that cluster analysis or clustering can be performed as part of classification, where clustering refers to the task of grouping a set of objects in such a way that objects in the same group (called a cluster) are more similar (in some sense) to each other than to those in other groups (clusters). It is a main task of exploratory data mining, and a common technique for statistical data analysis, used in many fields, including pattern recognition, image analysis, information retrieval, bioinformatics, data compression, computer graphics and machine learning.

Machine-learning algorithms utilize the training data to find correlations among identified features (or combinations of features) that affect an outcome. A trained machine-learning model may be implemented to perform a machine-learning operation based on a combination of features. An administrator of a machine-learning system may also determine which of the various combinations of features are relevant (e.g., lead to desired results), and which ones are not. The combinations of features determined to be (e.g., classified as) successful are input into a machine-learning algorithm for the machine-learning algorithm to learn which combinations of features (also referred to as "patterns") are "relevant" and which patterns are "irrelevant." The machine-learning algorithms utilize features for analyzing the data to generate an output or an assessment. A feature can be an individual measurable property of a phenomenon being observed. The concept of feature is related to that of an explanatory variable used in statistical techniques such as linear regression. Choosing informative, discriminating, and independent features is important for effective operation of the machine-learning system in pattern recognition, classification, and regression. Features may be of different types, such as numeric, strings, and graphs.

The machine-learning algorithms utilize the training data to find correlations among the identified features that affect the outcome or assessment. The training data includes known data for one or more identified features and one or more outcomes. With the training data and the identified features the machine-learning tool is trained. The machine-learning tool determines the relevance of the features as they correlate to the training data. The result of the training is the trained machine-learning model. When the machine-learning model is used to perform an assessment, new data is provided as an input to the trained machine-learning model, and the machine-learning model generates the assessment as output.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further, the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however, the distributed computing environment depicted herein is merely exemplary. Components can be configured for performing novel embodiments of embodiments, where the term "configured for" can refer to "programmed to" perform particular tasks or implement particular abstract data types using code.

Further, while embodiments of the present invention may generally refer to the technical solution environment and the schematics described herein, it is understood that the techniques described may be extended to other implementation contexts.

Embodiments of the present invention have been described in relation to particular embodiments that are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A computer-implemented method for synthesizing a view of a dynamic scene, the method comprising:
generating a motion estimate for a dynamic element in a dynamic scene depicted in a video;
using a neural network to represent the dynamic scene depicted in the video, the neural network comprising a first neural network for representing static elements of the dynamic scene and a second neural network for representing dynamic elements of the dynamic scene;
training the second neural network using the motion estimate;
receiving from the neural network a set of colors and densities representing the dynamic scene from a novel camera view, wherein the set of colors and densities are derived from a first output from the first neural network and a second output from the second neural network linearly blended based on a blending weight, the blending weight derived as a function of training convergence; and
rendering the novel camera view of the dynamic scene from the set of colors and densities, wherein the blending weight causes the first output of the first neural network to be used to render the static elements of the dynamic scene and the second output of the second neural network to be used to render the dynamic elements of the dynamic scene.

2. The method of claim 1, wherein the rendering comprises accumulating color values from different scene depths for each pixel being rendered.

3. The method of claim 1, wherein a representation of the dynamic scene in the second neural network comprises six dimensions and wherein one of the six dimensions is time.

4. The method of claim 1, wherein the method further comprises receiving from the neural network a 3D scene flow and rendering the novel camera view of the dynamic scene using the 3D scene flow.

5. The method of claim 1, wherein the method further comprises training the neural network to represent the dynamic scene depicted in the video through use of a photoconsistency loss to enforce, during training, that a scene representation is temporally consistent with the video.

6. The method of claim 1, wherein the method further comprises training the neural network using a depth estimation of the dynamic scene to encourage an expected termination depth computed along a ray to be close to the depth estimation.

7. One or more computer-storage media having computer-executable instructions embodied thereon that, when executed by a computing system having a processor and memory, cause the processor to perform operations:
generating a motion estimate for a dynamic element in a dynamic scene depicted in a video;
using a neural network to hold a six dimensional representation of the dynamic scene depicted in the video, wherein the neural network comprises a first neural network for representing static elements of the dynamic scene in a five dimensional representation and a second neural network for representing dynamic elements of the dynamic scene in the six dimensional representation, and wherein one of six dimensions in the six dimensional representation is time;

training the second neural network using the motion estimate;

receiving from the neural network a 3D scene flow indicative of an object movement within the dynamic scene;

receiving from the neural network a set of colors and densities representing the dynamic scene from a novel camera view, wherein the set of colors and densities are derived from a first output from the first neural network and a second output from the second neural network linearly blended based on a blending weight, the blending weight derived as a function of training convergence; and rendering a view of the dynamic scene from the 3D scene flow, wherein the blending weight causes the first output from the first neural network to be used to render the static elements in the dynamic scene and the second output from the second neural network to be used to render the dynamic elements in the dynamic scene.

8. The media of claim 7, wherein the rendering also uses the blending weight, the first set of colors and densities, and the second set of colors and densities, wherein the rendering comprises accumulating color values from different scene depths for each pixel being rendered.

9. The media of claim 7, wherein the operations further comprise training the neural network using camera pose data for the video.

10. The media of claim 7, wherein the operations further comprise training the neural network using a depth estimation of the dynamic scene that encourages an expected termination depth computed along a ray to be close to the depth estimation.

11. The media of claim 7, wherein operations further comprise training the neural network using a photoconsistency loss to enforce, during training, that a scene representation is temporally consistent with the video.

12. A method of synthesizing a view of a dynamic scene comprising:

generating a motion estimate for a dynamic element in a dynamic scene depicted in a video;

using a neural network to hold a representation of the dynamic scene depicted in the video wherein the neural network comprises a first neural network for representing static elements of the dynamic scene in a five dimensional representation and a second neural network for representing dynamic elements of the dynamic scene in the six dimensional representation, and;

training the second neural network using the motion estimate;

receiving from the neural network a 3D scene flow indicative of an object movement within the dynamic scene;

receiving from the neural network a set of colors and densities representing the dynamic scene from a novel camera view, wherein the set of colors and densities are derived from a first output from the first neural network and a second output from the second neural network linearly blended based on a blending weight derived as a function of training convergence between the first neural network and the second neural network; and rendering the novel camera view of the dynamic scene from the 3D scene flow and the set of colors and densities, wherein the blending weight causes the first output from the first neural network to be used to render the static elements of the dynamic scene and the second output of the second neural network to be used to render the dynamic elements of the dynamic scene.

13. The method of claim 12, wherein the rendering comprises accumulating color values from different scene depths for each pixel being rendered.

14. The method of claim 12, wherein the method further comprises training the neural network using a depth estimation of the dynamic scene to encourage an expected termination depth computed along a ray to be close to the depth estimation.

15. The method of claim 12, wherein the method further comprises training the neural network using a photoconsistency loss to enforce, during training, that a scene representation is temporally consistent with the video.

* * * * *